(12) United States Patent
Iwanaga et al.

(10) Patent No.: US 6,869,725 B2
(45) Date of Patent: Mar. 22, 2005

(54) SEALED BATTERY

(75) Inventors: Masato Iwanaga, Tokushima (JP); Syuichi Yamashita, Tokushima (JP); Masanori Ogi, Tokushima (JP); Zensaku Yasutake, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 199 days.

(21) Appl. No.: 10/304,051

(22) Filed: Nov. 26, 2002

(65) Prior Publication Data

US 2003/0148175 A1 Aug. 7, 2003

(30) Foreign Application Priority Data

Nov. 28, 2001 (JP) .......................... 2001-362183
Mar. 19, 2002 (JP) .......................... 2002-076477

(51) Int. Cl.[7] .......................... H01M 2/18; H01M 2/02; H01M 6/10; H01M 2/14
(52) U.S. Cl. .......................... 429/130; 429/164; 429/94; 429/129; 429/133; 429/140; 429/145; 429/247
(58) Field of Search .............................. 429/130, 164, 429/94, 129, 133, 140, 145, 247

(56) References Cited

FOREIGN PATENT DOCUMENTS

| JP | 4-332481 | 11/1992 | |
|---|---|---|---|
| JP | 8-250155 | 9/1996 | |
| JP | 9-270251 | 10/1997 | |
| JP | 11-224689 | * 8/1999 | .......... H01M/10/40 |

* cited by examiner

Primary Examiner—Patrick Ryan
Assistant Examiner—Angela J. Martin
(74) Attorney, Agent, or Firm—Westerman, Hattori, Daniels & Adrian, LLP

(57) ABSTRACT

The center pin 20 is cylindrical and tube-shaped, and each of the planes formed by the external surface of the center pin 20 in the vicinity of the edges 22a and 22b of the slit 21 is angled toward the inside of the center pin 20. The edges 22a and 22b are therefore arranged to be more inward than the imaginary circumference that complements the gap from the slit 21 of the center pin 20, and consequently, the edges 22a and 22b have less possibility of contacting and damaging the spiral-wound electrode assembly 10 in the event an external force deforms the center pin 20.

Further, the planes formed by the external surface of the center pin 20 in the vicinal areas 23a and 23b of the edges 22a and 22b are angled so as to form an angle of no greater than 120 degrees.

11 Claims, 5 Drawing Sheets

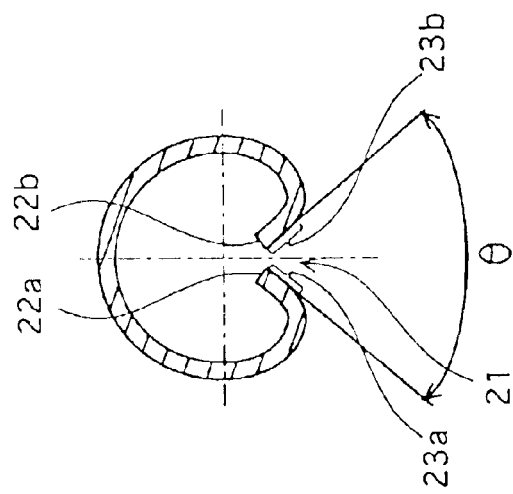
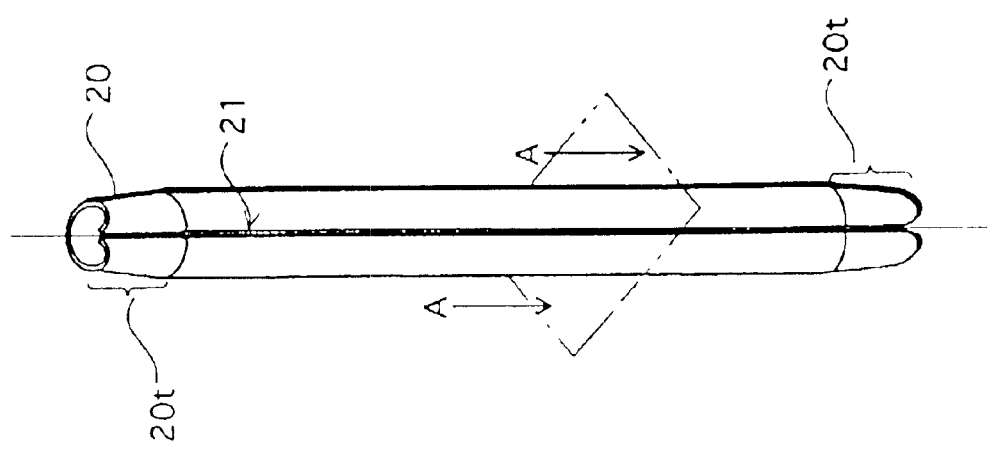

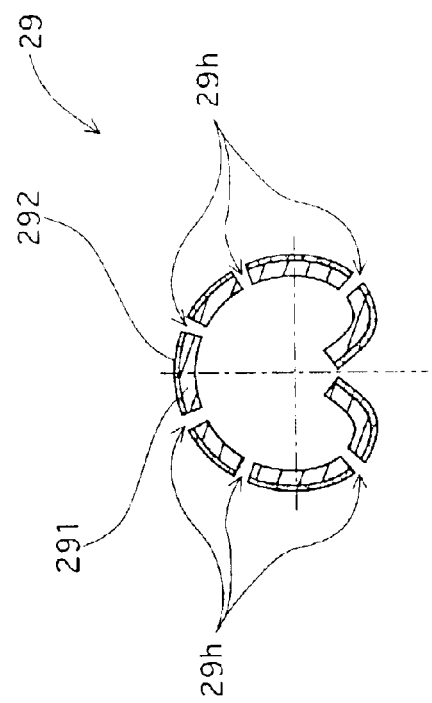
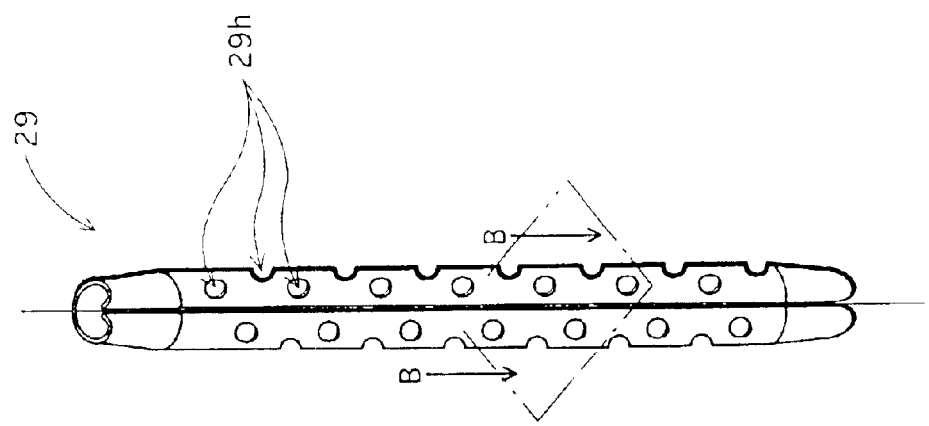

SEALED BATTERY

BACKGROUND OF THE INVENTION (1) Field of the Invention

The present invention relates to a sealed battery used as a power supply for portable electronic devices and the like.

(2) Description of the Related Art

The rapid spread of portable electronic devices in recent years has brought about the wide spread of sealed batteries as power supplies for those devices. As electronic devices have achieved better performance and compactness, there are also demands that sealed batteries become miniaturized, lightweight, and high-energy.

Among sealed batteries, sealed secondary batteries, which is rechargeable for repeated use, have been widely and remarkably spread these days, and especially, non-aqueous secondary batteries such as lithium ion batteries have come into wide use for their advantages in light weight and high energy density.

The following explains the structure of a sealed battery of the prior art, with a cylindrical lithium ion battery taken as an example.

A cylindrical lithium ion battery has a spiral-wound electrode assembly therein, which was obtained by spirally winding a structure made up of a positive sheet, a negative sheet, and a separator interposed therebetween, the spiral-wound electrode assembly being cased in a can with electrolyte being charged therein, and the can being sealed with a sealing lid.

Generally speaking, the spiral-wound electrode assembly is disposed around a space, which is the result of having removed a core used for spirally winding the electrode assembly. In some cases, a center pin that is cylindrical and tube-shaped is inserted in this space. The center pin is provided for the following two purposes:

The first purpose is to suppress deformation of the sheets in the spiral-wound electrode assembly caused by repeated recharging and discharging. More specifically, as a lithium ion battery repeatedly goes through recharging and discharging, the spiral-wound electrode assembly will expand, and since it cannot expand outward because of the can, it expands mainly toward the center space. At this time, the sheets in the spiral-wound electrode assembly may get deformed near the center space, and a short circuit may occur in the deformed part. Thus, the center pin is inserted to prevent the spiral-wound electrode assembly from being deformed toward the center space, and the sheets from being deformed near the center space.

The second purpose is to prevent the lithium ion battery from rupturing when the lithium ion battery is thrown into a fire by mistake and the temperature inside gets over 200 degrees Celsius, with the cylindrical and tube-shaped center pin acting as a gas exhaust duct inside the battery. Usually, a separator in a lithium ion battery is made of a microporous membrane, for example a polyethylene membrane, and such a separator will melt at a temperature of 200 degrees Celsius or higher. In such a case, the melted separator will flow into the center space that is acting as a gas exhaust duct, and obstruct the passage. Thus, the center pin is inserted to keep the gas exhaust duct open at the center of the spiral-wound electrode assembly even if the separator melts in the event that the battery is thrown into a fire.

The center pin, serving the above-mentioned purposes, is normally formed by rolling up a metal thinplate into a cylindrical tube shape for reasons related to the cost and the gas exhaust efficiency, and the two edges of the plate in the circumferential direction are usually not joined together; therefore, there remains a slit between the two edges of the plate.

When a lithium ion battery gets dropped from a height, or conversely, something gets dropped onto a lithium ion battery from a height, the can may be also deformed. When such an external force is applied to a lithium ion battery as to deform the can, the center pin inside may be also deformed. In the event that the center pin gets deformed to a large extent, the separator may be damaged, or an edge of the slit of the center pin may thrust into the spiral-wound electrode assembly.

In case the separator gets damaged, a short circuit will occur inside the lithium ion battery; however, since the concerning area is relatively large and the short-circuit current density is small, the battery will not have such a high temperature as approximately 130 degrees Celsius or higher.

On the other hand, in case the separator is not damaged, but an edge of the slit of the center pin has thrust into the spiral-wound electrode assembly, the concerning area of the short circuit inside the spiral-wound electrode assembly is small and the short-circuit current density is large due to a local short circuit; the battery therefore is likely to have a very high temperature of approximately 130 degrees Celsius or higher.

SUMMARY OF THE INVENTION

In view of the above-mentioned problems, an object of the present invention is to provide a sealed battery which has less possibility of causing abnormal heat generation due to an internal short circuit, even if an external force is applied thereto so as to deform the can.

In order to achieve the object, the present invention provides a sealed battery comprising: an electrode assembly that includes a separator, a positive sheet, and a negative sheet, the separator being interposed between the positive sheet and the negative sheet, and the electrode assembly being disposed around an interior space; and a center pin that is tube-shaped and inserted in the interior space, and has at least one opening in a wall thereof, wherein one or more edges of the opening are arranged, at part or a whole length of each of the edges, to be more inward than an imaginary circumference of the center pin, so as to be out of contact with the electrode assembly.

In the sealed battery of the present invention, since one or more edges of the opening are arranged, at part or a whole length of each of the edges, to be more inward than an imaginary circumference of the center pin, so as to be out of contact with the electrode assembly, even if the center pin gets deformed, the edges, which are arranged to be more inward at part or the whole length of the edges, have less possibility of damaging the electrode assembly.

Accordingly, the sealed battery of the present invention has less possibility of causing abnormal heat generation due to an internal short circuit, even if an external force to deform the can is applied.

Here, the imaginary circumference is a circumference of, for example, a cylinder-shaped object in which depressed parts are complemented in case some parts of the circumference of the object are depressed so as to form a concave.

In addition, the opening of the center pin refers to not only an opening that is visually identifiable, but also a slit that is not visually identifiable and yet whose edges are not joined together. More specifically, the opening may be (a) a slit in the wall of a pin when the pin is made by rolling a plate without an overlap, (b) an opening at the end of the roll when the pin is made by spirally winding a plate into a roll, or (c) a lengthwise slit on a pipe when the pipe originally has a slit. The above-mentioned arrangement is especially effective when the center pin has a slit in the wall, as having been made from a plate being rolled without an overlap, because the center pin has less possibility of damaging the electrode assembly even if getting deformed.

Further, in order to lower the possibility of having the electrode assembly damaged by the edges of the center pin when an external force is applied so as to deform the center pin, it would be preferable if each of planes formed by an external surface of the center pin in the vicinity of the edges is angled inwardly. Particularly, it would be preferable if the angle between the planes is no greater than 120 degrees outward. This way, it is possible to minimize the damage to the electrode assembly. The basis of the preferable angle will be explained later.

The minimum value of the angle between the planes formed by the external surface is not zero degrees (when the planes are parallel). The angle gets to the minimum value when the edges are in contact with the internal surface of the center pin at the vicinity of the edges; therefore, it would be desirable if one or all of the edges are either in contact with or near the internal surface of the center pin at the vicinity of the edges in order to have the effects mentioned above.

The shape of center pins may vary, but it would be ideal if the center pin has a substantially cylindrical shape, because there would be no pointed areas in the cross section, and also the processability would be high. Here, the cylinder-shaped object does not show a complete circle in the cross section, but one or more parts of the circumference are depressed so as to form a concave.

In the sealed battery of the present invention, it would be preferable if the center pin further has one or more through holes in the wall thereof for passage between inside and outside of the center pin because it is possible to reduce the weight as well as to allow the electrolyte to circulate in and out of the center pin even in the middle range of the length of the electrode assembly, which is for the benefit of the performance of the battery. Particularly, it would be preferable if a plurality of through holes are provided in all areas of the wall of the center pin.

Further, it will be desirable if the center pin is made of a metal for the easiness of processing and its low cost.

Furthermore, the present invention is effective with a sealed battery comprising an electrode assembly and a center pin, especially a sealed non-aqueous secondary battery that has a high energy density.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2A and FIG. 2B are detailed views of the center pin of FIG. 1;

FIG. 4A and FIG. 4B are a perspective view and a sectional view of the center pin comprised in the lithium ion battery of the third embodiment respectively.

DESCRIPTION OF THE PREFERRED EMBODIMENT

First Embodiment

Figure 1:
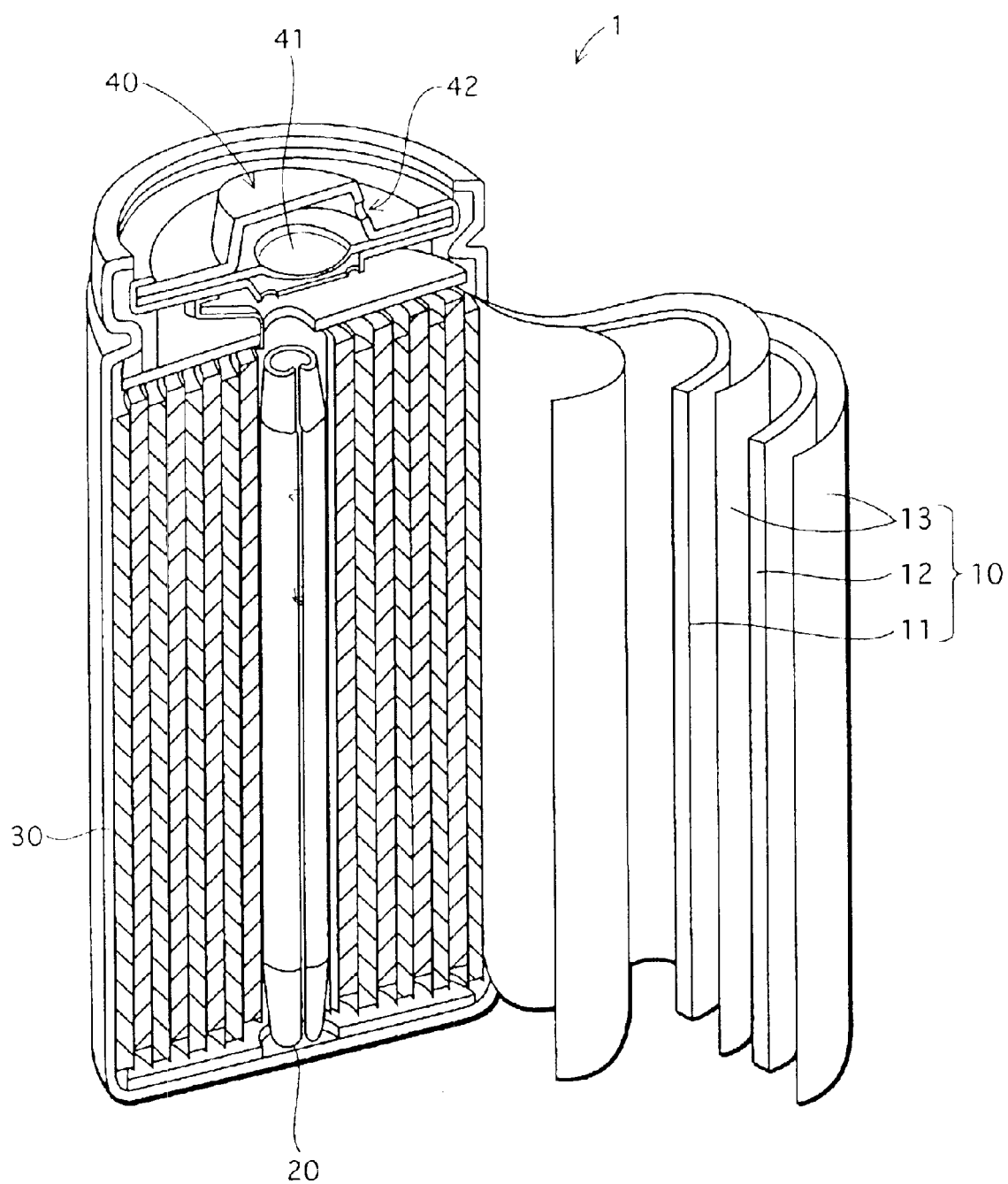
FIG. 1 is a perspective view of the exterior (partially sectional view) of the lithium ion battery of the first embodiment.

The following describes a lithium ion battery of the first embodiment of the present invention, with reference to FIG. 1, FIG. 2A, and FIG. 2B.

FIG. 1 is a perspective view (partially sectional view) to show the structure of the lithium ion battery 1 of the first embodiment of the present invention. FIG. 2A and FIG. 2B are a perspective view and a sectional view of the center pin comprised therein respectively.

As shown in FIG. 1, the lithium ion battery 1 has a structure in which a spiral-wound electrode assembly 10 is housed in a can 30 that is in the shape of a cylinder with a bottom, and has its opening sealed with a sealing lid 40 being crimped thereon.

The sealing lid 40 includes a rupture disk 41 and a gas vent 42. The rupture disk 41 and the gas vent 42 are provided in order to release gas to the outside of the lithium ion battery 1 in case some gas is generated inside the lithium ion battery 1, and consequently, the pressure inside the battery exceeds a predetermined level. In other words, in case some gas is generated inside the lithium ion battery 1 as the battery being thrown into a fire or in some other way, the gas breaks the rupture disk 41 to make a gap at a point in time when the inside pressure of the battery exceeds a predetermined level, and gets released to the outside of the battery through the gap and the gas vent 42.

The spiral-wound electrode assembly 10 is made up of a positive sheet 11 and a negative sheet 12 opposing each other with a separator 13 interposed therebetween, altogether spirally wound with use of a core for winding. More specifically, the spiral-wound electrode assembly 10 is prepared in the following way:

Firstly, a slurry is manufactured by mixing (i) $LiCoO_2$ as a positive active material, (ii) carbon black as a conductive member, (iii) polyvinylidene fluoride as a binder, and (iv) an N-metyl-2-pyrrolidone solution (hereafter referred to as NMP) as a solvent. Then, the slurry is applied to both sides of an aluminum foil (20 μm thick) which is a positive current collector, in all areas except for where a positive current collector tab will be welded onto. When the solvent gets dry, the current collector will be pressed by a roller till it gets to the predetermined thickness, and will be cut down to the predetermined width and length before the positive current collector tab made of aluminum will be welded on it. This is how the positive sheet 11 is prepared.

In parallel, another slurry is manufactured by mixing (i) graphite powder as a negative active material, (ii) polyvinylidene fluoride as a binder, and (iii) an NMP solution as a solvent. Then, the slurry is applied to both sides of a copper foil (16 μm thick) which is a negative current collector, in all areas except for where a negative current collector tab will be welded onto. When the solvent gets dry, the negative current collector tab made of nickel will be welded on the current collector. This is how a negative sheet 12 is prepared.

Next, a spiral-wound electrode assembly 10 is prepared by spirally winding the positive sheet 11 and the negative sheet 12 and a separator 13 (25 μm thick) interposed therebetween altogether, the separator 13 being made of a polyethylene microporous membrane.

The spiral-wound electrode assembly 10 is disposed around a space, which is the result of having removed a core used for spirally winding the electrode assembly, and a center pin 20 that is cylindrical and tube-shaped is inserted in the space.

As mentioned above, the center pin 20 is inserted for two purposes such as (i) to keep the gas exhaust duct open in case the lithium ion battery is in an abnormal state (e.g. being thrown into a fire by mistake), and (ii) to suppress deformation of the positive sheet 11 and the negative sheet 12 in the spiral-wound electrode assembly 10 near the center space when the battery is repeatedly recharged and discharged.

The following explains the structure of the center pin 20, with reference to FIG. 2A and FIG. 2B.

As shown in FIG. 2A, the center pin 20 is cylindrical and tube-shaped, and has a slit 21 lengthwise. The center pin 20 is made of a thin metal plate that has been cut down to a rectangle of a predetermined size, and for reasons related to limited labor and costs as well as gas exhaust efficiency, the two edges viewed in a cross section are usually not joined together; therefore, there remains the slit 21 between the edges.

The thin plate used for the center pin 20 may be of any material as long as it is heat-resistant and anticorrosive against the electrolyte, as well as it has appropriate processability and a reasonable cost. For example, a stainless plate of 0.05 to 0.5 mm thickness would be appropriate.

At the top end and the bottom end of the center pin 20 are tapered areas 20t. The tapered areas 20t are provided in order to make it easy to insert the center pin into the center space around which the spiral-wound electrode assembly 10 is disposed and to avoid damaging the separator 13 at the time of insertion. The tapered areas 20t are formed by drawing processing or pressing, after the thin plate having been rolled up.

The following explains the shape of the center pin 20 with reference to FIG. 2B. FIG. 2B is an auxiliary sectional view as seen in the direction of the arrows A—A of FIG. 2A.

As shown in FIG. 2B, the center pin 20 is substantially cylindrical and tube-shaped, and is substantially circular in cross section. It should be noted here that the vicinal areas 23a and 23b of the edges 22a and 22b of the slit 21 are angled to draw curves toward the inside of the cylinder so that the planes formed by the external surface form an angle θ. Thus, the edges 22a and 22b are arranged to be more inward than an imaginary circumference that complements the slit 21 of the center pin 20; and consequently the parts angled do not form an acute angle.

Here, it would be preferable if the angle θ is no greater than 140 degrees, and particularly if no greater than 120 degrees, where the angle θ being an angle between the planes formed by the external surface of the vicinal areas 23a and 23b, with the angle outward with respect to the outside of the center pin 20 being expressed as an angle with a positive value.

The center pin 20 maybe formed, for example, by processing of round bending with use of a multi-forming machine equipped with a die in a specific shape.

Alternatively, the center pin 20 may be formed by rolling a rectangular plate into a cylindrical tube shape in the same way as in the prior art, and fitting a wedge-shaped tool that has a predetermined angle θ at its end into the slit 21, while maintaining the cylindrical shape. The methods of forming the center pin are not limited to these.

The center pin 20 having a structure as mentioned above has less possibility of damaging the spiral-wound electrode assembly 10 and causing abnormal heat generation from a internal short circuit, even if the center pin gets deformed by a force applied from the outside of the lithium ion battery 1. The reasons can be explained as follows:

In a battery of the prior art, in case an external force is applied to the battery at a point 90 degrees away from the opening direction of the slit of the center pin, the edges of the slit gets deformed toward the spiral-wound electrode assembly, and damages the spiral-wound electrode assembly to cause a short circuit inside.

On the other hand, in the lithium ion battery 1 of the first embodiment, with the center pin 20 inserted, since the edges 22a and 22b are arranged to be more inward than the imaginary circumference of the center pin 20, the edges 22a and 22b have less possibility of contacting the separator 13 and damaging the spiral-wound electrode assembly 10, even if an external force to deform the center pin 20 is applied.

Accordingly, it is possible to provide a battery with high reliability, because even if the lithium ion battery 1 gets deformed by an external force, there is less possibility of having a short circuit inside the spiral-wound electrode assembly 10 of the battery, and of causing abnormal heat generation due to the short circuit.

It should be noted here that FIG. 2B shows the center pin 20 with the angle θ being approximately 80 degrees, but the more the vicinal areas 23a and 23b get folded in, the smaller the angle θ will be. In other words, the vicinal areas 23a and 23b can be angled even more till they become parallel in which case the angle θ becomes 0 degrees, or can be angled even further more till the angle θ gets to be a negative value, which will be mentioned later as a modification example.

Second Embodiment

Figure 3:
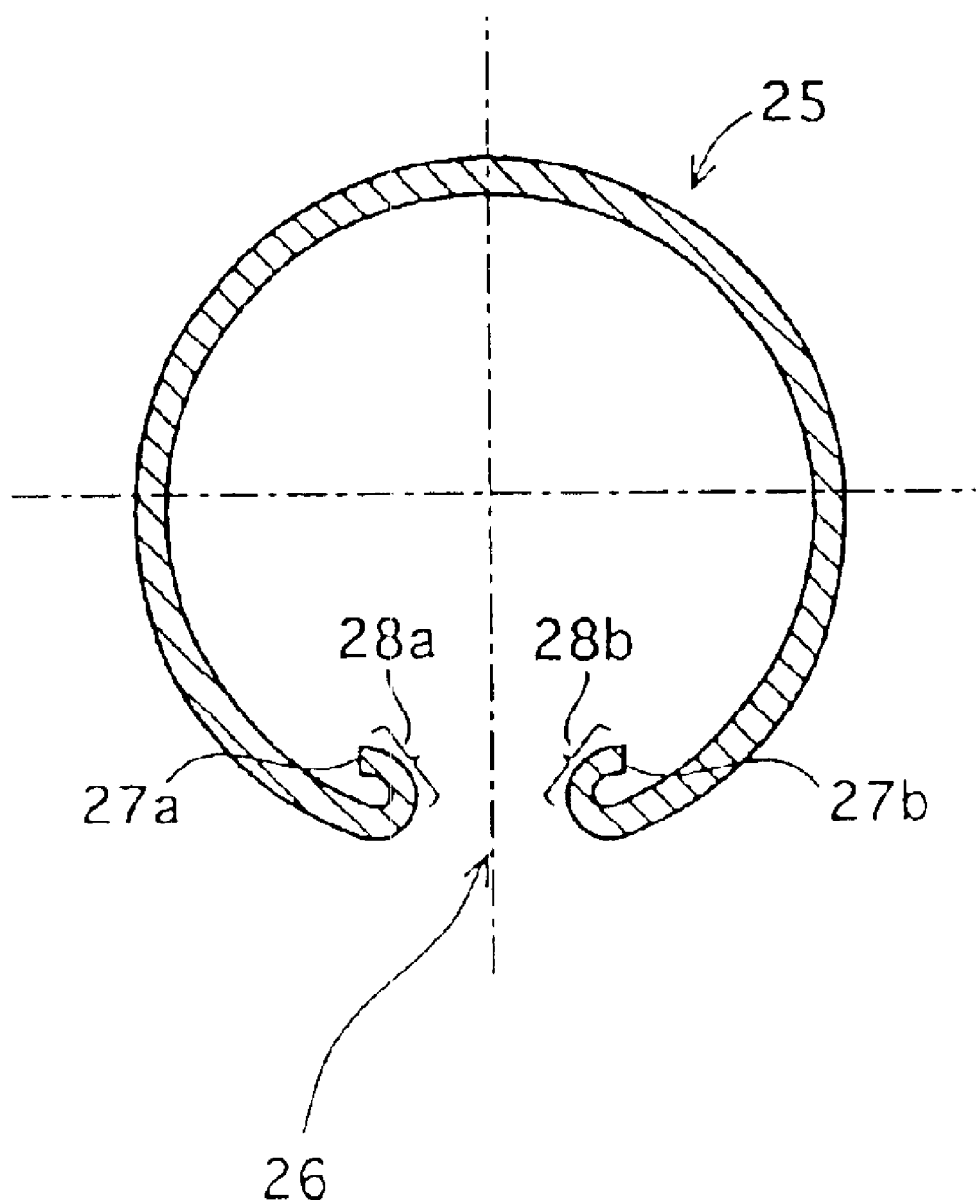
FIG. 3 is a sectional view of the center pin comprised in the lithium ion battery of the second embodiment.

The following explains the center pin 25 comprised in a lithium ion battery of the second embodiment, with reference to FIG. 3. FIG. 3 is a sectional view of the center pin 25.

Here, the basic structure of the battery is the same as the lithium ion battery 1. The difference is in the figure of the cross section of the center pin 25.

As shown in FIG. 3, the center pin 25 of the present embodiment is obtained, in the same manner as the center pin 20, by forming a metal (e.g. stainless) thin plate into a cylindrical tube shape, and there is a slit 26 between the two edges 27a and 27b which can be viewed in a cross section.

The center pin 25 is different from the center pin 20 in that the center pin 25 is folded in so that the external surfaces of the vicinal areas 28a and 28b of the edges 27a and 27b are even more inward than in the above-mentioned center pin 20 shown in FIG. 2B, to the extent that the edges 27a and 27b get near the internal surface of the center pin 25. More specifically, the vicinal areas 28a and 28b are angled inward, but not outward with respect to the outside of the center pin 25; therefore, the angle θ introduced in the FIG. 2B is smaller than zero degrees in this case.

It is possible to form the center pin 25 with such a structure by processing of round bending with use of a multi-forming machine, substantially in the same manner as the center pin 20 mentioned above.

The edges 27a and 27b in the center pin 25 have further less possibility of contacting the separator 13 than those in the center pin 20 do, even if an external force deforms the center pin.

Consequently, a lithium ion battery comprising the center pin 25 has less possibility of having the separator 13 damaged by the edges 27a and 27b than the lithium ion battery 1 of the first embodiment, in case an external force causes deformation.

In conclusion, in the lithium ion battery comprising the center pin 25, the center pin 25 has less possibility of damaging the spiral-wound electrode assembly 10 and causing abnormal heat generation by a short circuit inside the spiral-wound electrode assembly 10, even if an external force deforms the battery and the center pin 25.

Third embodiment

The following explains a lithium ion battery of the third embodiment, with reference to FIG. 4A and FIG. 4B. FIG. 4A is a perspective view of the exterior of, and FIG. 4B is a sectional view of, the center pin 29 comprised in the lithium ion battery of the third embodiment.

Since the structure of the battery is the same as in the first and second embodiments, except for the center pin 29, the explanation will be omitted.

As shown in FIG. 4A, the center pin 29 is different from the center pin 20 mainly in two ways.

Firstly, a plurality of circular through holes 29h are provided in the wall of the center pin. The through holes 29h are provided evenly in all areas of the wall of the center pin 29 and pierced through the wall of the center pin 29 in the direction of its thickness.

Secondly, an insulating film is formed on the external surface of the wall of the center pin. This will be explained with reference to FIG. 4B. FIG. 4B is a sectional view taken along the line B—B of FIG. 4A.

As shown in FIG. 4B, the center pin 29 with through holes 29h can be obtained by forming an insulating film 292 on the external surface of a metal plate 291 which has been shaped by processing of round bending with use of a multi-forming machine and the like. The insulating film 292 is, for example, a layer that is 1 to 20 μm thick and made of silicone resin, and had been applied to the metal plate before it went through the processing of round bending.

A lithium ion battery comprising the center pin 29 with such features is lighter than the lithium ion batteries of the first and second embodiments by the weight of the material removed for making the through holes 29h. This is very effective since there is a demand that batteries get lighter in units of 0.1 gram. For instance, in case the through holes 29h are provided in a center pin made of stainless (SUS304), 0.25 mm in thickness, φ3.0 mm in outside diameter, and 59.5 mm in height, with the ratio of through holes 29h against the surface area of the center pin being 50 percent, the center pin is approximately 0.4 gram lighter than the one without through holes, even with the weight of the insulating film 292 taken into account.

In addition, the through holes 29h in the center pin 29 also improve the circulation of the electrolyte inside the battery. In other words, such a lithium ion battery has better circulation of electrolyte inside, since the electrolyte is able to circulate in and out of the center pin 29 via the through holes 29h. Accordingly, such a lithium ion battery has higher performance as a battery because of smooth ion exchange inside.

Furthermore, a lithium ion battery comprising the center pin 29 has less possibility of having the spiral-wound electrode assembly damaged than the lithium ion batteries of the first and second embodiments, in the event that an external force is applied to the battery and the center pin 29 gets deformed for the following two reasons:

The first reason is that when an external force is applied to the center pin 29 with the through holes 29h provided on the wall thereof, parts of the center pin that have the through holes 29h get deformed first and therefore absorbs the external force. Thus, the edges of the slit have less possibility of getting deformed.

The second reason is that the center pin 29 with the insulating film 292 formed on its external surface has less possibility of causing a short circuit than a center pin with a bare metal surface, even if it gets deformed toward the spiral-wound electrode assembly.

In conclusion, a lithium ion battery comprising the center pin 29 is lightweight, has high battery performance, and assures safety in case an external force is applied to the battery.

In the explanation above, the shape of the through holes 29h in the center pin 29 was circular, but the shape is not limited to this. The shape of the through holes 29h may be, for example, triangular, rectangular, or polygonal. The ideal ratio of through holes 29h against the surface area of the center pin would be 30 to 50 percent so as to maintain the intensity.

The insulating film 292 can be made of another material besides silicone resin, as long as it is an insulative material, such as another kind of resin or ceramic. The insulating film 292 may be formed not only on the external surface, but also on the internal surface or the surface of the edges.

Other Concerns

In the above-mentioned embodiments and modifications, the present invention has been explained with an example of a cylinder-shaped lithium ion battery in which metal foils are used as current collectors, and sheets are formed by applying active materials on the foils; however, the type and the shape of the battery are not limited to these, as long as the battery is a sealed battery with a center pin being inserted in the center space around which the electrode assembly is disposed. The present invention is effective for a nickel metal hydride battery, a nickel-cadmium battery, or a battery comprising an electrode assembly with a stack structure.

It would be preferable if a center pin to be inserted is cylindrical and tube-shaped as mentioned above, for it can be easily formed, but the shape is not limited to this. For example, in case of a flat prismatic battery comprising a spiral-wound electrode assembly, it is possible to insert a center pin that is oval in cross section into the center space around which the electrode assembly is disposed. The present invention can be applied to such a center pin as well.

The material of the center pin has been introduced as stainless, but the material is not limited to this. For instance, it is acceptable to use aluminum, nickel, titanium, steel or an alloy of such.

Further, in the embodiments and modifications mentioned above, the vicinal areas of the edges are angled inwardly at the whole length of the edges, but it is also acceptable if angled only at some of the length of the edges. For example, it is possible that only the part that may be easily deformed by an external force (e.g. near the middle range in the axis direction of the center pin) is angled. It should be noted here that, when the edge is angled only partially, it is preferable to make the boundary between the angled part and the non-angled part smooth so there would be no pointed area.

In the embodiments above, the vicinal areas of both of the edges are angled, but even if only the vicinal area of one of the edges is angled, there is some effect to make that particular edge have less possibility of damaging the electrode assembly.

In addition, the center pin may have a spiral-wound structure. In such a case, only the edge exposed to the exterior may be angled so that it is directed toward the inside of the center pin. This way, even if the center pin gets deformed, the center pin has less possibility of damaging the electrode assembly and causing abnormal heat generation due to a short circuit inside the sealed battery.

Further, it is possible to have the same effect as above on a center pin arranged to have three or more edges as viewed in cross section, by making it so that the edges are arranged to be more inward than the imaginary circumference.

CONFIRMATION EXPERIMENTS

The effects of the present invention mentioned above have been confirmed by the following experiments 1 and 2.

Experiment 1

Experiment 1 was performed to confirm the effect of the first embodiment. In this experiment, lithium ion batteries as the following 5 test samples and 1 comparative sample were used. The batteries used in this experiment have specifications as follows:
Type of the batteries: cylindrical lithium ion batteries
Size: outside diameter $\phi$18 mm
  height 65 mm
Separator: microporous membrane made of polyethylene
  thickness t=25 $\mu$m
Center Pin: made of stainless (SUS304)
  thickness 0.25 mm
  outside diameter $\phi$3.0 mm
  height 59.5 mm
(1) Test Sample 1
Bending processing was performed so that the angle between the planes formed by the external surface of the center pin at the vicinal areas of the edges of the slit is 60 degrees outward.
(2) Test Sample 2
Bending processing was performed so that the angle between the planes formed by the external surface of the center pin at the vicinal areas of the edges of the slit is 80 degrees outward.
(3) Test Sample 3
Bending processing was performed so that the angle between the planes formed by the external surface of the center pin at the vicinal areas of the edges of the slit is 100 degrees outward.
(4) Test Sample 4
Bending processing was performed so that the angle between the planes formed by the external surface of the center pin at the vicinal areas of the edges of the slit is 120 degrees outward.
(5) Test Sample 5
Bending processing was performed so that the angle between the planes formed by the external surface of the center pin at the vicinal areas of the edges of the slit is 140 degrees outward.
(6) Comparative Sample
Bending processing was not performed (as in the prior art), and the angle between the planes formed by the external surface of the center pin at the vicinal areas of the edges of the slit is 180 degrees outward.

Figure 5:
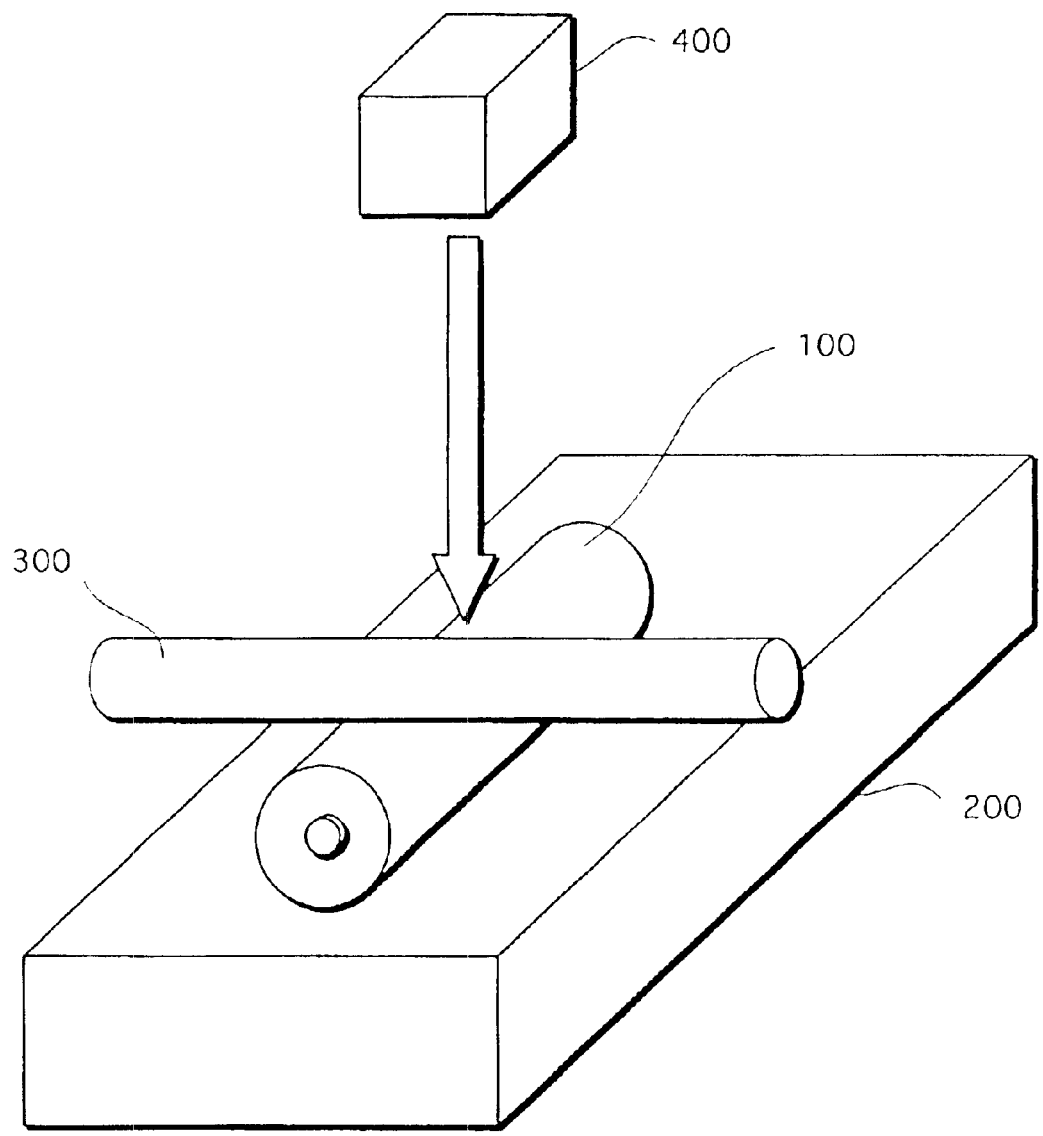
FIG. 5 is a perspective view of an impact-test apparatus.

For each of the samples (1) through (6), fifty lithium ion batteries were prepared to go through impact tests with use of the testing apparatus in FIG. 5.

As shown in FIG. 5, the impact tests were performed by placing a lithium ion battery 100 on the stage 200 and putting an iron bar 300 which is $\phi$16 mm in outside diameter on top of the battery, before dropping a weight 400 weighing 9.1 kilogram from five different levels of height above the lithium ion battery 100. The levels of height from which the weight was dropped were 10 cm, 20 cm 30 cm, 40 cm, and 50 cm above the upper surface of the lithium ion battery 100. The impact tests were performed on ten lithium ion batteries 100 for each of the levels of height.

For additional information, although it is not shown in the drawing, both ends of the iron bar 300 were supported by supporting members which discontinued supporting upon the dropped weight 400 hitting the iron bar 300. A thermocouple was installed on the lithium ion batteries 100 to measure the temperature of the batteries.

In this experiment, we counted (i) how many of lithium ion batteries 100 had an internal short circuit and (ii) how many of short circuited lithium ion batteries 100 had a temperature of 130 degrees Celsius or higher. The results are shown in Table 1.

TABLE 1

| Height to drop the weight from | Comparative Sample | Test Sample 1 | Test Sample 2 | Test Sample 3 | Test Sample 4 | Test Sample 5 |
|---|---|---|---|---|---|---|
| 10 cm | 1/1 | 0/0 | 0/0 | 0/0 | 0/0 | 0/0 |
| 20 cm | 2/2 | 0/0 | 0/0 | 0/0 | 0/0 | 0/0 |
| 30 cm | 4/4 | 0/0 | 0/0 | 0/0 | 0/0 | 1/1 |
| 40 cm | 0/10 | 0/10 | 0/10 | 0/10 | 0/10 | 0/10 |
| 50 cm | 0/10 | 0/10 | 0/10 | 0/10 | 0/10 | 0/10 |

In the table, the values denote "the number of batteries that experienced an internal short circuit and had a temperature of 130 degrees Celsius or higher"/"the number of batteries that experienced an internal short circuit".

As shown in Table 1, in case the height of the weight was 40 cm or more, all of the tested lithium ion batteries 100 experienced an internal short circuit due to the separator being damaged; consequently, there were no batteries that had a temperature of 130 degrees Celsius or higher because the short circuit current density was small as explained above.

In case of the lithium ion batteries as Comparative Samples, when the level of the weight 400 was 10 cm, 20 cm, or 30 cm, the batteries experienced an internal short circuit and had a temperature of 130 degrees Celsius or higher. That means, in the lithium ion batteries 100 as Comparative Samples, with a small external force being applied, the edges of the slit in the center pin damaged the spiral-wound electrode assembly, and caused an internal short circuit and made the temperature of the battery 130 degrees Celsius or higher.

On the contrary, none of lithium ion batteries of Test Samples 1 through 4 experienced an internal short circuit in the impact tests with the weight 400 being dropped from the levels of 10 cm, 20 cm or 30 cm. Thus, it can be observed that they have excellent features against deformation.

In case of the lithium ion batteries of Test Sample 5, one out of the ten tested batteries experienced an internal short circuit in the impact tests with the weight 400 being dropped from the level of 30 cm. As explained before, in the batteries of Test Sample 5, the angle between the planes formed by the external surface of the center pin at the vicinal areas of the edges of the slit is 140 degrees. It means that the lithium ion batteries of Test Sample 5 have more possibility of experiencing an internal short circuit than the batteries of Test Samples 1 through 4 in case an external force deforms the center pin, because the edges of the center pin are arranged to be closer to the separator of the spiral-wound electrode assembly even before the deformation occurs, due to the angle being wide. It should be noted here that even in the lithium ion batteries of Test Sample 5, occurrence of internal short circuits was suppressed more than in the batteries of Comparative Sample.

It can be observed from the results above that it is appropriate if the angle between the planes formed by the external surface of the center pin at the vicinal areas of the edges of the slit is no greater than 120 degrees.

Although no experiments were performed, the center pin 25 of the second embodiment is supposed to be more effective in suppressing occurrence of internal short circuits in the event an external force is applied, compared to the center pins in the batteries of Test Samples 1 through 4 used in the Experiment 1. The reason is because the edges of the slit have less possibility of contacting the electrode assembly in the event an external force deforms the center pin 25.

Experiment 2

Experiment 2 was performed to confirm the effect of the third embodiment. The batteries used in this experiment have specifications as follows: Type of the batteries: cylindrical lithium ion batteries Size: outside diameter φ18 mm height 65 mm Separator: microporous membrane made of polyethylene thickness t=25 μm Center Pin: made of stainless (SUS304)

thickness 0.25 mm outside diameter φ3.0 mm height 59.5 mm (1) Test Sample 1

Lithium ion batteries that have the same specification as the batteries of Test Sample 1 used in the Experiment 1 and each comprise a center pin that does not have through holes or an insulating film formed thereon.

(2) Test Sample 6

Lithium ion batteries of Test Sample 6 each comprise a center pin which has been obtained by making through holes in the center pin of Test Sample 1, and does not have an insulating film formed thereon. The shape of the through holes is circular, and the ratio of through holes against the surface area of the center pin is 50 percent.

(3) Test Sample 7

Lithium ion batteries of Test Sample 7 each comprise a center pin which has been obtained by coating the external surface of the center pin of the Test Sample 6 with silicone resin.

For each of the samples (1) through (3), forty lithium ion batteries were prepared to be evaluated by the following two experiments:

Evaluation 1

Impact tests were performed by using the same impact-test apparatus shown in FIG. 5, and dropping the weight from three different levels of height such as 20 cm, 40 cm ad 60 cm. For each of the levels of height, 10 batteries of each Test Sample went through the test.

The evaluating method is different from in Experiment 1, and we counted how many batteries had a temperature of 40 degrees Celsius or higher immediately after the test.

Evaluation 2

10 batteries of each Test Sample were heated externally and we counted how many batteries ruptured. More specifically, the tests were performed by placing a fully-charged battery on a hot plate of 250 degrees Celsius and leaving it there for a while to count how many of the batteries had the electrode assembly fling out of the can.

The results of the tests and the mass of the center pins comprised in each of the batteries are shown in Table 2.

TABLE 2

|  | Height to drop the weight from | Test Sample 1 | Test Sample 6 | Test Sample 7 |
| --- | --- | --- | --- | --- |
| Impact Tests | 20 cm | 5 | 0 | 0 |
|  | 40 cm | 9 | 3 | 0 |
|  | 60 cm | 10 | 10 | 10 |
| External Heating |  | 0 | 0 | 0 |
| Mass of the center pins (grams) |  | 1.0 | 0.5 | 0.6 |

As shown in Table 2, with regard to the mass of the center pins, the center pin of Test Sample 1 is heaviest being 1.0 gram, and those of Test Sample 6 and Test Sample 7 are lighter being 0.5 gram and 0.6 gram respectively. The difference in the mass of the center pins of Test Samples 6 and 7 comes from the mass of the insulating films.

In the impact tests for Test Sample 1, five out of ten batteries had a temperature of 40 degrees Celsius or higher, even with the level of the weight being 20 cm, which means the ratio of occurrence of internal short circuits was 50 percent. On the other hand, in the impact tests for Test Samples 6 and 7, no batteries had a temperature of 40 degrees Celsius or higher, with the level of the weight being 20 cm, which means they had less possibility of having an internal short circuit caused by an external force. Especially, in the impact tests for Test sample 7, no batteries had a temperature of 40 degrees Celsius or higher, even with the level of the weight being 40 cm, which means they have less possibility of having an internal short circuit.

With regard to the external heating tests, no batteries of Test Samples 1, 6, and 7 ruptured, which means that the center pin ensures that a gas exhaust duct is kept open, even heat of 250 degrees Celsius is applied to the battery.

In conclusion, batteries comprising a center pin with through holes are lighter by the weight of the material removed for making the through holes, and are highly impact-proof because they have less possibility of having the electrode assembly damaged by the center pin when an external force is applied to the batteries.

In addition, batteries comprising a center pin that have an insulating film formed on the external surface thereof as well as through holes show a remarkable effect in impact-proof, although they are heavier by the weight of the insulating films.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A sealed battery comprising:

an electrode assembly that includes a separator, a positive sheet, and a negative sheet, the separator being interposed between the positive sheet and the negative sheet, and the electrode assembly being disposed around an interior space; and a center pin that is tube-shaped and inserted in the interior space, and has at least one opening in a wall thereof, wherein one or more edges of the opening are arranged, at a whole length of each of the edges, to be more inward than an imaginary circumference of the center pin, so as to be out of contact with the electrode assembly.

2. The sealed battery of claim 1, wherein the opening is a slit provided lengthwise in the wall of the center pin.

3. The sealed battery of claim 2, wherein each of planes formed by an external surface of the center pin in a vicinity of the edges is angled so that each of the edges is more inward than the imaginary circumference.

4. The sealed battery of claim 3, wherein an angle between the planes is no greater than 120 degrees outward.

5. The sealed battery of claim 2, wherein one or all of the edges are either in contact with or near an internal surface of the center pin at the vicinity of the edges.

6. The sealed battery of claim 2, wherein the center pin has a substantially cylindrical shape.

7. The sealed battery of claim 1, wherein the center pin further has one or more through holes in the wall thereof for passage between inside and outside of the center pin.

8. The sealed battery of claim 1, wherein the center pin is made of a metal.

9. The sealed battery of claim 1, wherein the electrode assembly has a spiral-wound structure in which the positive sheet, the negative sheet, and the interposed separator are altogether spirally wound.

10. The sealed battery of claim 1, wherein the sealed battery is a sealed non-aqueous secondary battery.

11. The sealed battery of claim 1, wherein an external surface of the wall of the center pin is covered with an electrically insulative film.

* * * * *